Dec. 17, 1929. W. G. HAGMAIER ET AL 1,740,086
ROOT CUTTING MACHINE
Filed May 17, 1928 2 Sheets-Sheet 1

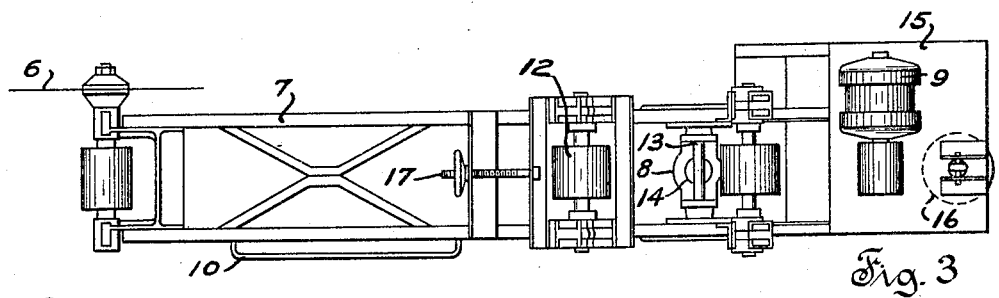
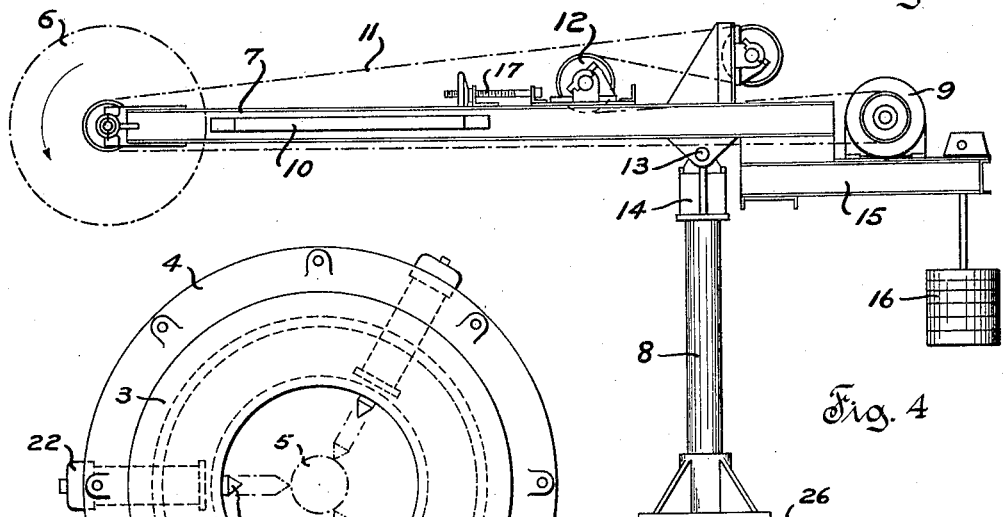
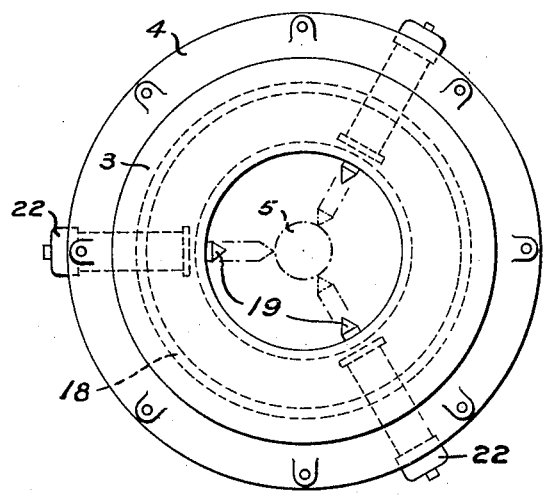
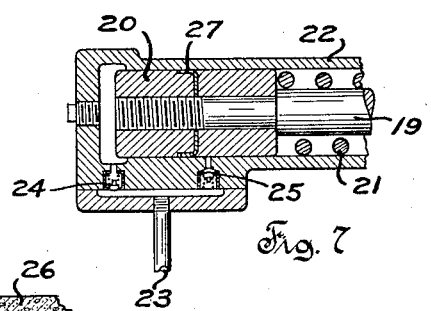
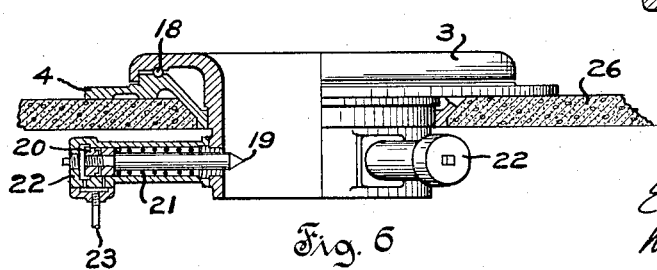

Patented Dec. 17, 1929

1,740,086

UNITED STATES PATENT OFFICE

WILLIAM G. HAGMAIER, OF WEST ALLIS, AND ERNEST C. SHAW, OF MILWAUKEE, WISCONSIN, ASSIGNORS TO ALLIS-CHALMERS MANUFACTURING COMPANY, OF MILWAUKEE, WISCONSIN, A CORPORATION OF DELAWARE

ROOT-CUTTING MACHINE

Application filed May 17, 1928. Serial No. 278,486.

The present invention relates to improvements in mechanisms for cutting irregular objects into pieces, and relates more specifically to an improved machine for sawing the roots and other projections from stumps or the like.

An object of the invention is to provide an improved machine for cutting irregular projections from objects such as stumps or tree trunks. Another object of the invention is to provide an improved root sawing machine wherein the roots may be quickly removed from stumps, while the latter are firmly held in a predetermined position. A further object of the invention is to provide a new and useful combined saw and work support, which will permit universal application of the saw to the work.

The industry of utilizing the stumps of pine trees or the like for the extraction of turpentine and by-products, has become quite extensive. The stumps are pulled bodily from the ground, and the protruding roots and limbs are subsequently sawed off and reduced to chips. These chips are treated for the removal of turpentine and other products, and are finally reduced to pulp which is utilized in the manufacture of explosives and paper.

It has heretofore been an extremely difficult matter to effectively handle the stumps in order to remove the roots, and it is an object of the present invention to provide improved mechanism for permitting removal of the roots from the stumps, rapidly and in a convenient manner.

A clear conception of an embodiment of the invention may be had by referring to the drawings accompanying and forming a part of this specification in which like reference characters designate the same or similar parts in the various views.

Fig. 3 is a top view of the swing saw which is utilized in accordance with the present invention, to remove the roots.

Fig. 4 is a side elevation of the swing saw disclosed in Fig. 3.

Fig. 5 is a top view of the turntable employed for supporting the stumps during removal of the roots.

Fig. 6 is a part sectional side elevation of the turntable illustrated in Fig. 5.

Fig. 7 is an enlarged fragmentary sectional view of one of the stump holding spurs, and of the mechanism for moving the same.

Figure 1:
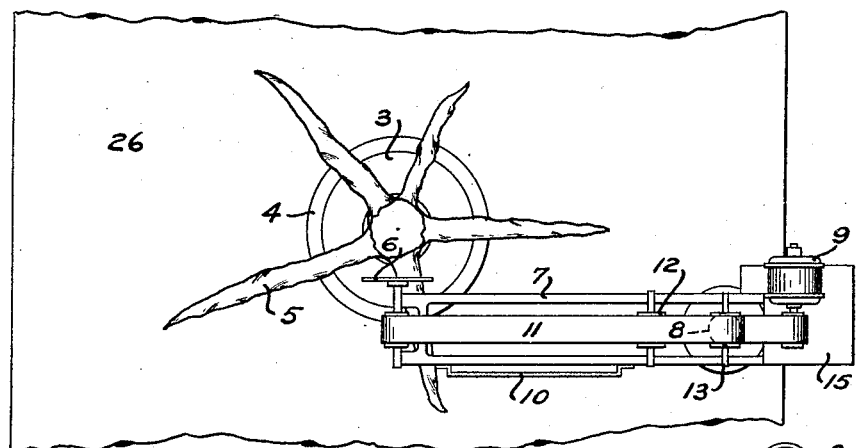
Fig. 1 is a top view of one embodiment of the improved root cutting removing machine.
Figure 2:
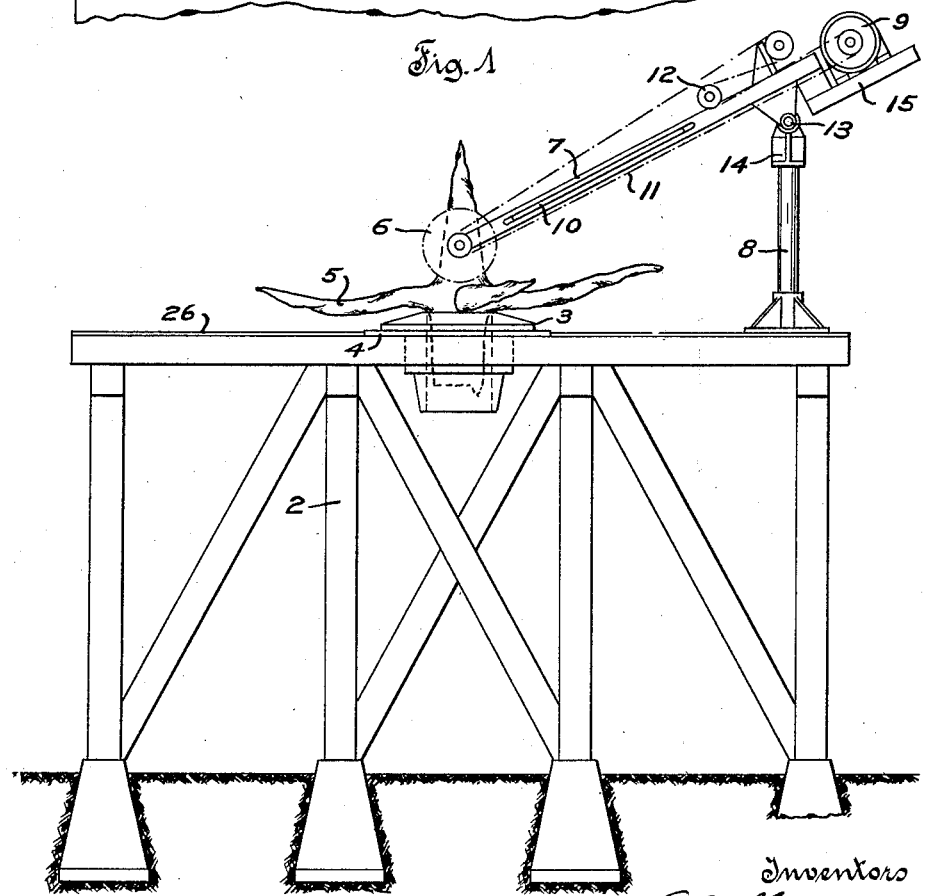
Fig. 2 is a side elevation of the improved root cutting machine shown in Fig. 1.

Referring specifically to Figs. 1 and 2, the root cutting machine comprises in general a turntable 3 constituting means for rotatably supporting a stump 5, and a circular saw 6 mounted for both vertical and horizontal displacement relative to the turntable 3. Both the turntable and the saw are mounted upon a platform or deck 26 which may be supported upon a frame structure 2, as shown.

The turntable 3 shown in detail in Figs. 5, 6 and 7, is freely rotatably supported upon a base plate 4, the weight of the table 3 and of the elements associated therewith, being carried upon an antifriction or ball-bearing 18, and the table being held against horizontal displacement, by means of a guide bearing formed on the base plate 4. In order to positively retain a stump 5 in inverted position upon the turntable 3, the table may be provided with a series of adjustable spurs 19 operable by fluid under pressure. As shown, the spurs 19 have pistons 20 secured to their outer ends, and the pistons 20 are slidable within cylinders 22 radiating from the lower portion of the turntable 3. Springs 21 normally tend to urge the spurs 19 away from the axis of the turntable, and fluid under pressure such as steam or compressed air, may be admitted to the cylinders 22 at the outer ends of the pistons 20, through flexible connections 23 in order to force the spurs 19 inwardly against a stump 5. The connections 23 communicate with chambers in the cylinders 22 which in turn communicate with valves 24, 25, the valve 24 being a cushioning valve and also serving for the admission of fluid under pressure, and the valve 25 being an exhaust valve for permitting escape of fluid upon reduction of the pressure in the connection 23. The pistons 20 may be provided with cup leather packings 27 as shown, in order to prevent undesirable escape of fluid under pressure and consequent release of the stump.

The saw supporting structure is shown in detail in Figs. 3 and 4, and comprises a frame 7 which is swingably supported upon a column 8 by means of a horizontal pivotal support 13 and a vertical pivotal support 14. The pivotal supports 13, 14 permit swinging of the frame 7 so that the circular saw 6 carried by the swinging end of the frame 7 may be moved either vertically or horizontally with respect to the turntable 3. Such movement may be readily effected by means of a handle 10 associated with the side of the frame 7, and the weight of the saw 6 and of the frame 7 may be counter-balanced by means of a platform 15 and adjustable counter-balancing weights 16 associated with the platform. By providing such counter-balancing means, the manipulation of the saw 6 may be conveniently accomplished, and the pressure necessary for driving the saw through the work may be applied by the operator.

The saw 6 is rotatable by means of a belt 11 cooperating with a series of pulleys one of which is rotatable by an electric motor 9 supported upon the platform 15. The pulley 12 is an idler pulley for taking up excessive slack in the belt 11, and the position of the pulley 12 upon the frame 7, may be adjusted by means of a tensioning device 17 such as shown in Figs. 1 and 2.

During normal operation of the apparatus the stump 5 after having been pulled from the ground and after removal of the dirt therefrom, may be inserted in inverted position within the turntable 3, as shown in Figs. 1 and 2. The spurs 19 may then be adjusted by admission of fluid under pressure to the cylinders 22, so as to centralize the stump 5 upon the turntable 3 and to firmly grip and hold the same in position. With the stump 5 thus supported upon the turntable, it may be freely revolved about the vertical turntable axis, by an operator stationed upon the deck 26. The saw 6 after being set in motion by operation of the motor 9, may be brought into cooperative relation with any of the protruding roots of the stump 5, and at any point, by manipulation of the turntable through the stump roots and by further manipulation of the frame 7 with the aid of the handle 10. The roots may be thus removed one after another, until the stump is entirely free from projections, whereupon the same may be removed from the turntable 3 upon release of the fluid pressure from the pistons 20.

From the foregoing description it will be apparent that the improved root cutting machine provides simple and effective means for confining the stump during treatment thereof, and for enabling removal of the roots. The turntable support for the roots, and the universal support for the saw 6, permit removal of all of the projections from the stumps with minimum waste of material. The entire apparatus while effectively accomplishing the results sought, is extremely simple and compact, and may be readily operated from the deck 26.

It should be understood that it is not desired to limit the invention to the exact details of construction and operation herein shown and described, for various modifications within the scope of the claims may occur to persons skilled in the art.

It is claimed and desired to secure by Letters Patent:

1. In combination, a turntable having a recess formed to receive a stump, movable means within said recess for holding a stump upon said turntable, and a saw mounted to swing in planes parallel to and transversely of the axis of said turntable.

2. In combination, a turntable having a central recess formed to receive a stump, spurs movable into said recess for holding a stump upon said turntable, and a saw mounted to swing in planes parallel to and transversely of the axis of said turntable.

3. In combination, a turntable having a central circular recess formed to receive a stump, spurs movable radially into said recess to hold a stump upon said turntable, and a saw movable to swing in planes parallel to and transversely of the axis of said turntable.

4. In combination, a turntable having a central recess formed to receive a stump, spurs simultaneously movable into said recess to hold a stump centrally with respect to said turntable, and a circular saw rotatable about a horizontal axis and mounted to swing in planes parallel to and transversely of the axis of said turntable.

5. In combination, a turntable having a central circular recess formed to receive a stump, a plurality of spurs movable radially into said recess to hold a stump upon said turntable, fluid pressure actuated means for simultaneously moving all of said spurs, and a circular saw rotatable about a horizontal axis and mounted to swing in planes parallel to and transversely of the axis of said turntable.

In testimony whereof, the signatures of the inventors are affixed hereto.

WILLIAM G. HAGMAIER.
ERNEST C. SHAW.